Patented June 22, 1926.

1,590,097

UNITED STATES PATENT OFFICE.

LUDWIG HÖRMANN, OF TSCHECHNITZ, NEAR BRESLAU, AND FELIX KAUFLER, OF MUNICH, GERMANY, ASSIGNORS TO THE FIRM: DR. ALEXANDER WACKER-GESELLSCHAFT FÜR ELEKTROCHEMISCHE INDUSTRIE G. M. B. H., OF MUNICH, BAVARIA, GERMANY.

PROCESS FOR MANUFACTURING ACETIC ANHYDRIDE.

No Drawing. Application filed February 2, 1924, Serial No. 690,293, and in Germany February 12, 1923.

When sulphur chloride and chlorine or sulphur and chlorine react upon a dry acetate, acetic anhydride is formed. In the case of sodium acetate for instance the sulphur is transformed into sodium sulphate and the chlorine into sodium chloride and thus they remain in a solid form in the mixture.

The reaction proceeds quite differently if instead of an acetate free acetic acid is used. Auger and Béhal (Bull. Soc. Chim. III 2, page 144) have shown that according to the temperature sulphur tetrachloride or sulphur chloride and chlorine react upon acetic acid with formation of acetyl chloride and chloracetic acid in good yield. The sulphur is transformed into sulphur dioxide, and a part of the chlorine into hydrochloric acid. Under the conditions used acetic anhydride is not formed at all or only in a very small amount.

According to the present invention, by the action of sulphur chloride and chlorine or of sulphur and chlorine on free acetic acid (glacial acetic acid), acetic anhydride may be obtained in an excellent yield when the chlorine is allowed to react, with cooling, upon a mixture of sulphur chloride ($S_2Cl_2$) or sulphur and glacial acetic acid in the proportion of one atom of sulphur to four atoms of chlorine to 4 molecules acetic acid, the mixture being afterwards heated to finish the reaction, and finally distilled. The reaction may be represented by the equation:—

According to that equation for 4 molecules acetic acid one atom sulphur and four atoms chlorine are used. This process of formation is very surprising as it is known that acetic anhydride, when heated with chlorine in the presence of acetic acid is easily transformed into chloracetic acid (see Hentschel, Ber. 17, page 1286) and that the presence of sulphur chloride favours the formation of chloracetic acid (see Auger and Béhal, loc. cit.).

The process may consist in leading chlorine into a mixture of the calculated proportions of sulphur chloride and glacial acetic acid whilst cooling and stirring until the ratio 1S:4Cl is attained and no sulphur is precipitated on diluting a test portion with water. The absorption of the chlorine proceeds rapidly and perfectly. If the cooling be satisfactory only very small traces of hydrochloric acid and sulphur chloride escape. When the mixture is heated, $SO_2$ and HCl escape for a time. When the evolution of gas is finished the acetic anhydride is separated in the known manner by distillation in a vacuum or under normal pressure. In order to retain the easily volatilized compounds of sulphur chloride and the acetyl chloride which is intermediately formed, the reflux condenser should be well cooled. Losses by evaporation of the sulphur chloride are made good by the addition of sulphur chloride during the reaction. Escaping sulphur chloride and acetyl chloride may be retained by leading the gases that pass over through glacial acetic acid which is then used as parent material in the process.

An excess of the acetic acid may be used, in which case a mixture of acetic anhydride and acetic acid is the product; this is useful for some purposes.

The sulphur is preferably used in the form of sulphur chloride having the empirical composition $S_2Cl_2$ or $SCl_2$, but elementary sulphur may be used by suspending it in a fine state of subdivision in the acetic acid.

The action of the chlorine preferably takes place under a somewhat elevated pressure (introduction of the chloride wholly or in part below the level of the liquid) which is favourable to the process.

The invention constitutes a considerable technical advance, in that the manufacture of anhydrous salts necessary for the processes used hitherto is avoided and that the highly concentrated acetic acid obtained by the modern synthetic process may be used as parent material. Since no solid salts are contained in the mixture undergoing reaction and the sulphur used, as well as the chlorine, escape in the course of the reaction as volatile products, the process may be a continuous one, which is impossible in the processes known hitherto. For this purpose the mixture of sulphur chloride or sulphur and acetic acid is treated with chlorine in counter-current in an irrigation apparatus, while cooling, and then allowed to flow in a continuous manner through a distilling apparatus. The continuous working allows of a considerable simplification of the apparatus and saves cost.

The following examples illustrate the invention, the parts being by weight:

*Example 1.*—300 parts of glacial acetic acid and 118 parts of sulphur chloride containing 33.9 per cent of sulphur, are placed in a stirring apparatus having a cooling jacket. Whilst cooling and stirring, chlorine is introduced in such a way that no considerable amount of hydrochloric acid or chlorine escapes and until no sulphur chloride can be detected in the liquid by diluting a test portion of it with water. The mixture is then slowly warmed and heated until $SO_2$ and HCl are no longer evolved. The remaining product is fractionated in known manner. 260 grams of a product are obtained, containing about 80 per cent of acetic anhydride.

*Example 2.*—Instead of 118 parts of sulphur chloride, containing 33.9 per cent of sulphur, 80 parts containing 50 per cent of sulphur are used and accordingly a larger amount of chlorine is introduced. The working is the same as that described in Example 1 and the product is the same. The sulphur chloride may be replaced in this example by the equivalent amount of elementary sulphur which preferably is suspended in the acetic acid in a finely divided state.

*Example 3.*—For conducting the process in a continuous manner an irrigation tower charged with filling material is uniformly irrigated with a mixture of acetic acid and sulphur chloride while chlorine is introduced at the bottom. The tower is cooled to remove thoroughly the considerable amount of heat due to the reaction. In the lower part, where there has been a considerable absorption of chlorine, the temperature is kept at a lower degree than in the upper part in order to facilitate the absorption of the amount of chlorine necessary. For completing the absorption of chlorine, the liquid leaving the irrigation tower is further treated with chlorine under pressure and while cooling, until the reaction is complete. This may be done simply by allowing the liquid to accumulate up to a certain height and introducing the chlorine at the bottom. The product leaving the tower or saturating apparatus, and having the empirical composition $4CH_3COOH+S+4Cl$ runs through a distilling apparatus having a fractionating column and an efficient dephlegmator and cooler, so that only the gases $SO_2$ and HCl are allowed to escape. In the liquid still remains acetic anhydride which may be drawn off continuously. The product thus obtained is technically pure after one distillation. The yield of pure anhydride is more than 85 per cent of the theoretical yield.

Having now particularly described and ascertained the nature of our said invention, we declare that what we claim is:

1. A process of manufacturing acetic anhydride by causing sulphur chloride and chlorine to react upon acetic acid, the ratio of sulphur to chlorine to acetic acid undergoing reaction being one atom of sulphur to four atoms of chlorine to at least four molecules acetic acid, and heating till the reaction is completed.

2. A process of manufacturing acetic anhydride by causing sulphur chloride and chlorine to react upon acetic acid the ratio of sulphur to chlorine to acetic acid undergoing reaction being one atom of sulphur to four atoms of chlorine to at least four molecules acetic acid, the sulphur chloride being formed from sulphur and chlorine in the reaction mixture, and heating till the reaction is completed.

3. A process of manufacturing acetic anhydride by causing sulphur chloride and chlorine to react on acetic acid, the ratio of sulphur to chlorine to acetic acid undergoing reaction being one atom of sulphur to four atoms of chlorine to at least four molecules acetic acid, promoting the absorption of chlorine by working under an elevated pressure and heating till the reaction is completed.

4. A process of manufacturing acetic anhydride by causing sulphur chloride and chlorine to react on acetic acid, the ratio of sulphur to chlorine to acetic acid undergoing reaction being one atom of sulphur to four atoms of chlorine to at least four molecules acetic acid, and carrying out the introduction of the chlorine at temperatures below 30° C. and slowly heating the reaction mixture thereafter.

5. A process of manufacturing acetic anhydride by causing sulphur chloride and chlorine to react on acetic acid, the ratio of sulphur to chlorine to acetic acid undergoing reaction being one atom of sulphur to four atoms of chlorine to at least four molecules acetic acid and carrying out the process in a continuous manner by leading the chlorine in a countercurrent to the mixture of sulphur chloride and acetic acid in an apparatus allowing the cooling of the reacting mixture, heating the reaction product and leading the reaction product thereafter through a distilling apparatus in order to remove the chlorine compounds.

In testimony whereof we have hereunto set our hands.

Dr. LUDWIG HÖRMANN.
Dr. FELIX KAUFLER.